Patented Aug. 15, 1933

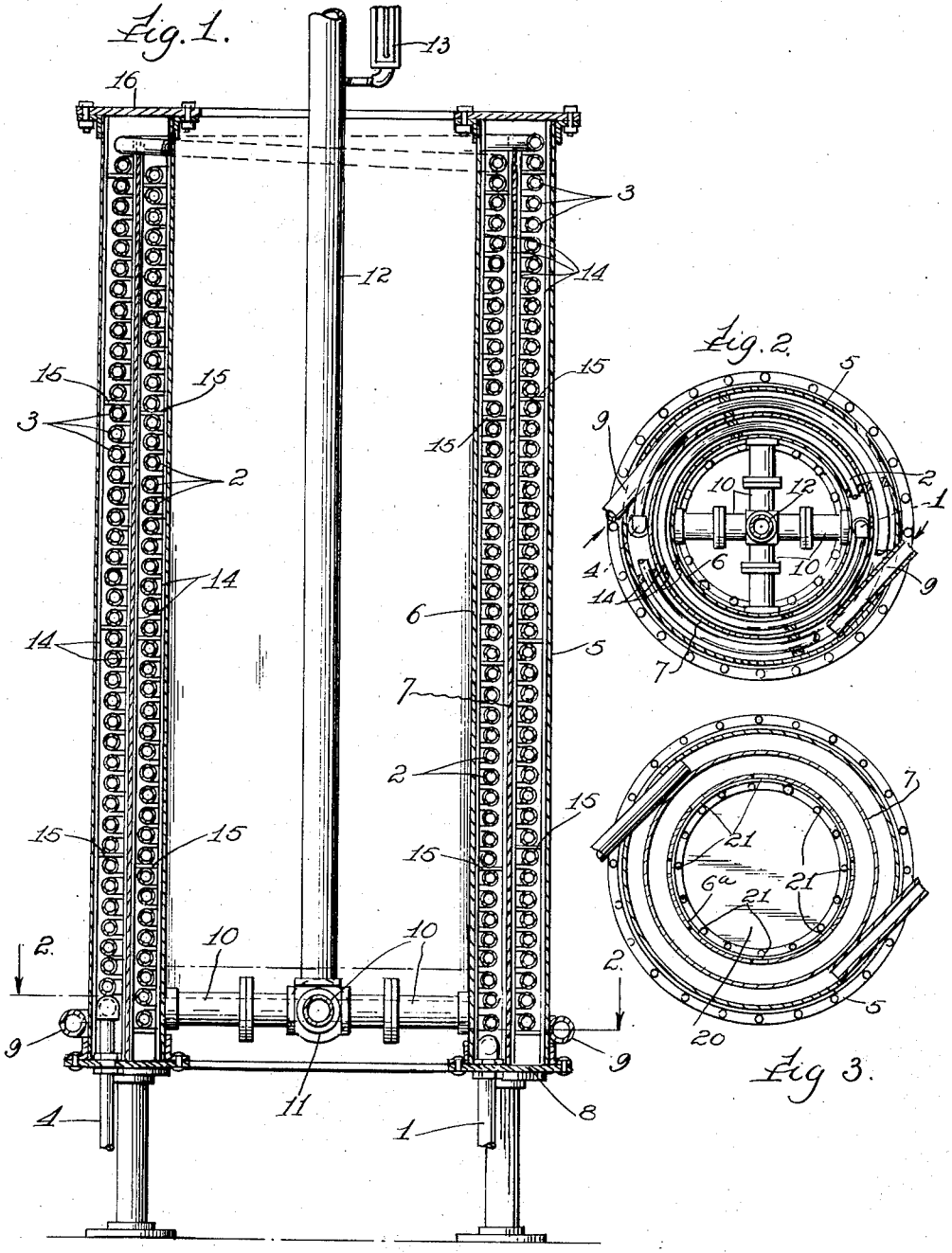

1,922,149

UNITED STATES PATENT OFFICE 1,922,149

COUNTER-CURRENT COOLER

Arnold W. Baumann, Chicago, Ill.

Application May 14, 1932. Serial No. 611,334

1 Claim. (Cl. 257—229)

This invention relates to coolers of a type particularly designed and intended for the cooling of condensed milk following its treatment in evaporating apparatus known as the "vacuum pan". One object of the invention is to provide a continuous smooth passage for the milk or any other fluid being similarly treated, such passage being so arranged that it can be readily and completely drained. Another object is to control the flow of cooling liquid in relation to the aforesaid passage so as to insure efficient cooling action without an undue difference of temperature as between two liquids at any point in the circuit. A further object is to provide a construction which can be economically built and installed, and which shall be relatively simple to operate. The invention consists in various features and elements of construction in combination, as herein shown and described, and as indicated by the claim.

In the drawing:

Figure 1 is a vertical section taken axially of the device.

Figure 2 is a transverse section on a smaller scale, taken substantially as indicated at line 2—2 on Figure 1.

Figure 3 is a transverse section similar to Figure 2, showing a modified construction, but omitting the coils.

The cooler which is the subject of this invention, has been particularly designed for use with sweetened condensed milk, which is heated for evaporating a portion of the water content in a so-called vacuum pan or corresponding apparatus, and is then passed through a cooler for reducing the temperature of the milk. In the cooling process there is a tendency for the sugar in the milk solution to crystallize to some extent, and if the warm solution meets with a sudden lowering of its temperature the crystals are likely to be large and coarse, or to agglomerate, whereas if the cooling can be effected gradually the crystals or sugar particles can be kept exceedingly fine, so that they remain unnoticeable in suspension in the thickened liquid. This is the more desirable result; accordingly, in my apparatus, I have arranged so that the cold water used to absorb heat from the milk shall come in contact first with the coolest portion of the milk, and as the water temperature rises, the water moves toward the warmer end of the milk conduit. There is always a considerable temperature difference maintained as between the water and the milk, so that transfer of heat is assured, but the temperature difference is approximately constant throughout the apparatus.

To accomplish the results discussed, I arrange the milk conduit in a pair of concentrically disposed helical coils, preferably constructed of continuous tubing. The inlet for the milk is indicated at 1, this being the lower end of the inner helical coil, 2, whose turns rise to the top of the apparatus where the last turn is connected into the upper turn of the outer coil, 3, through which the milk flows downwardly to an outlet, 4. The flow of the cooling water is controlled by mounting the coils, 2 and 3, in a tank of annular cross-section, having an outer cylindrical wall, 5, and an inner wall, 6, between which both coils, 2 and 3, are disposed. A cylindrical baffle wall, 7, rises from the bottom, 8, of the tank, to a point near the top, thus extending up to the last turn of the inner coil, so that only the portion of the tubing which connects the inner and outer coils extends over the top of the baffle wall, 7. The cooling water is admitted at the lower portion of the tank adjacent the outer wall, 5, preferably by means of two or more tangentially arranged inlets, 9, 9, as indicated in Figure 2. The incoming water, which is the coldest, thus comes first in contact with the milk in the coil, 3, adjacent the outlet, 4. The water rises between the outer wall, 5, and the baffle wall, 7, in contact with the coil, 3, until it overflows the baffle wall, 7, and descends between said baffle wall and the inner wall, 6, of the tank. Near the bottom of the tank the inner wall, 6, is provided with outlets shown connected into radially disposed pipes, 10, which lead to a central manifold fitting, 11, and thence to a stand pipe, 12, through which the outflowing water flows upwardly to any suitable discharge, not shown. Near the upper end of the outlet pipe, 12, a thermometer may be arranged at 13 to indicate the temperature of the water leaving the cooler.

As shown, the spacing of the baffle wall, 7 from the walls, 5 and 6, of the tank, is such that the clear space between the walls and the coils, 2 and 3, is not great; the result is that as the water enters tangentially at the inlets, 9, it tends to flow circularly, or rather helically, in the outer space or jacket surrounding the coil, 3, being more or less guided by the shape of the coils themselves, and, similarly, it will tend to follow the helical form of the coil, 2, in descending through the inner jacket. This tends to extend the path of the water movement approximately parallel to the path of flow of material through the helical coils, 2 and 3, but in the opposite direction, providing time for the exchange of heat from the milk to the water. By reason of this counter-current arrangement the temperature difference at any point in the circulation system within the cooler is kept at a minimum, since the coldest water entering at 9 comes in contact, first, with the tubes containing the nearly cooled milk approaching the outlet, 4, and as the water travels upwardly in the outer jacket, and then downwardly through the inner jacket, it absorbs more and more heat from the milk, so that the water at maximum temperature is that which flows in contact with the coils, 2, adjacent the inlet, 1, where the milk is the hottest.

Throughout the circuit the water is, of course, much cooler than the milk, and capable of absorbing heat therefrom at any point in the system.

The arrangement of the water outlet so that it includes the stand pipe, 12, insures that when the apparatus is shut down it will remain filled with water instead of immediately draining, or partially draining, as it might do if the outlet led downwardly from the manifold, 11.

For convenience of construction I have shown upright frame bars, 14, disposed at each side of the coils, 2 and 3, and connected at intervals by bolts, 15, which tend to hold the coils in properly spaced relation. These bars, 14, may be spaced in pairs at three or four points in the circumference of the coils, so that the milk coil may be set up as a unit and then inserted in the tank before the annular cover plate, 16, is placed in position.

Figure 3 shows a slight modification of the structure indicating how the expense of the outlet piping, 10, 11, 12, may be saved by making the bottom wall of the cooler a continuous circular plate instead of annular, as shown in Figure 1. The central portion, 20, of this wall, thus forms the bottom of a central chamber within the cylindrical wall, 6a, and a plurality of openings, 21, near the lower end of said wall, 6a, serve for discharge of cooling fluid from the inner annular chamber to the central space. Within the central space the cooling fluid will rise for overflow at the top, and, preferably, the top wall, instead of being annular, as shown at 16 in Figure 1, will be a complete circular cover plate with an outlet pipe (not shown) secured therein in any convenient manner.

I claim:

A cooling unit comprising an annular chamber for cooling fluid with a helical coil disposed therein, the walls of the chamber and said coil cooperating to form a helical path for the cooling fluid, the chamber having an inlet for the fluid adjacent one end of the coil and an outlet leading from a point near the opposite end, the inlet for said cooling fluid being arranged to discharge tangentially into the annular chamber for initiating the flow in a circumferential direction.

ARNOLD W. BAUMANN.